J. T. SIMPSON.
AEROPLANE.
APPLICATION FILED AUG. 22, 1911.

1,159,720.

Patented Nov. 9, 1915.
8 SHEETS—SHEET 1.

Witnesses:
Gustav A. Schullack
Geo. J. Hanson

Inventor
John T. Simpson
By Dyrenforth & Dyrenforth
Attorneys.

J. T. SIMPSON.
AEROPLANE.
APPLICATION FILED AUG. 22, 1911.

1,159,720.

Patented Nov. 9, 1915.
8 SHEETS—SHEET 6.

Witnesses:
Gustav A. Schellack
Geo. J. Hanson.

Inventor
John T. Simpson
By Dyrenforth Taylor
Attorneys.

UNITED STATES PATENT OFFICE.

JOHN THOMAS SIMPSON, OF NEWARK, NEW JERSEY.

AEROPLANE.

1,159,720.  Specification of Letters Patent.  Patented Nov. 9, 1915.

Application filed August 22, 1911. Serial No. 645,359.

*To all whom it may concern:*

Be it known that I, JOHN T. SIMPSON, a citizen of the United States, and residing in Newark, in the county of Essex and State of New Jersey, have invented a certain new and useful Aeroplane, of which the following is a specification.

The object I have in view is the production of an aeroplane which will have features of advantage in general design and improvements in details over those heretofore suggested.

One feature of design is the provision of means whereby the angle of the planes may be changed during flight. The angle of the sustaining planes must vary according to the speed of the machine. Heretofore, if a machine was intended for high speeds, the angle being a very small one, must be made before the machine starts. If the machine is not intended to have high speed but is intended for slow speed work the angle must be a sharper one. Heretofore this angle of the planes has been changed either in the design of the machine when it is built or by changing of the angles of the planes while it is at rest.

Another object is to produce a duplex arrangement of the propellers whereby a plurality of propellers is used. They may be disconnected or connected to the motor during flight, so that in the event of injury to one or more propellers, others can be relied upon without necessity of the machine descending to the ground.

Another object is to provide a duplicate arrangement of engine whereby the machine may be propelled by one or more engines and the number of engines in use may be changed during flight.

Another object is to produce greater safety by making the breaking of any control or guy not result in the falling of the machine, which provision I accomplish by making all of the guys and operating wires for the controls in duplicate and connecting them in such a manner that the strain is equally distributed.

A further object is to provide a flexible sustaining plane, which will automatically adjust itself to changes in force and direction of the wind.

A further object is to produce a design in which the operator will be protected in the event of accident from the weight of the machinery falling upon him.

Another object is to simplify the starting mechanism and to improve the braking and alighting mechanism.

A still further object is to provide a steering and stabilizing device which will be operated by a single manually actuated device.

Another object is to provide a device for starting the engine either at rest or during flight, without the operator leaving his seat.

Another object is to improve the details of construction of the planes.

Another object is to provide means whereby sudden changes of the force and direction of the wind will be automatically taken up.

These and further objects will appear from the following specification and accompanying drawings, considered together or separately.

In the drawings, Figure 1 is a plan view of the complete apparatus, with one-half of the main supporting plane removed. Fig. 2 is a sectional view taken on the line 2—2 of Fig. 1. Fig. 3 is a similar view taken on the line 3—3 of Fig. 1. Fig. 4 is a front elevation of half of the apparatus shown in Fig. 1. Fig. 5 is a sectional view taken on the line 5—5 of Fig. 1. Fig. 5$^a$ is a detailed sectional view taken on the line $a$—$a$ of Fig. 5. Fig. 8 is a similar view of the rear end of the apparatus. Fig. 9 is a sectional view, taken on the line 9—9 of Fig. 8, looking to the rear. Fig. 10 is detailed plan view showing the means for bracing the body. Fig. 11 is a side elevation of the same. Figs. 12 and 13 are detailed views of a device for tightening the body braces. Fig. 13$^a$ is a section on the line 13$^a$—13$^a$ of Fig. 12, the tightening device being omitted. Fig. 24 is a section on the line 24—24 of Fig. 23. Fig. 26 is a section taken on the line 26—26 of Fig. 25. Fig. 26$^a$ is a section on the line 26$^a$—26$^a$ of Fig. 25. Fig. 27 is a detailed sectional view of the means of bracing the forward edge of the lifting plane, said section being taken on the line 27—27 of Fig. 28. Fig. 28$^a$ is a sectional view similar to Fig. 28, showing the means for flexibly supporting the rearward edge of the main plane.

In all of the views, like parts are indicated by the same reference characters.

*General design.*—In general design, my improved aeroplane comprises a main sustaining plane 1, arranged adjacent to the fore end of the body, and of the usual cross-section shape, and with its two halves inclined at the correct dihedral angle. Below the main sustaining plane is an auxiliary sustaining plane 2. This auxiliary sustaining plane is preferably slightly narrower than the main sustaining plane, but of about the same spread, and it is formed of three parts; a fixed center part 3, and two adjustable wing parts 4—4, the center part 3 extending under the body and propellers and the machinery. On both sides, from points at about the centers of the propellers, are located the wing parts which are adjustable together for changing their angle of incidence in accordance with the speed of the machine, and independently for feathering or changing their angles for the purpose of stabilizing the machine, and also as a brake for slowing up at landing. The body 5 is long, narrow and boat-shaped, sharp at each end. It is above the engines and contains seats for the aviator and passengers, and also carries the tail, the balancing rudders and the rear skid. The supporting wheels are connected to the body, and are below the same. The controlling devices are attached to the body within convenient reach of the aviator. The machine as shown has two propellers and a tractor, which will be described in order, and two motors so arranged that they may be connected, one or both, to the two propellers, or one or both to the tractor.

Figures 1, 2, 3, 4, 5, 5A:
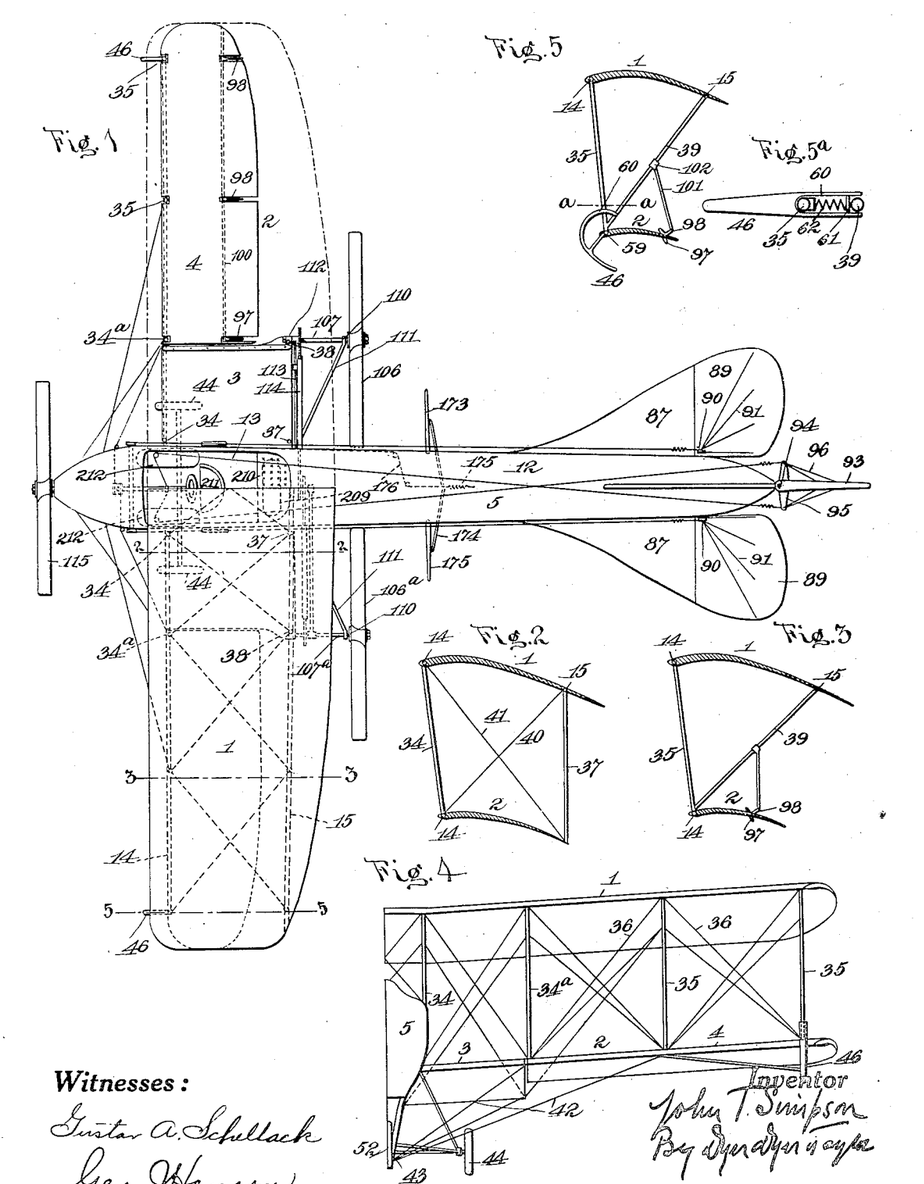
Figures 8, 9, 10, 11, 12, 13, 13A:
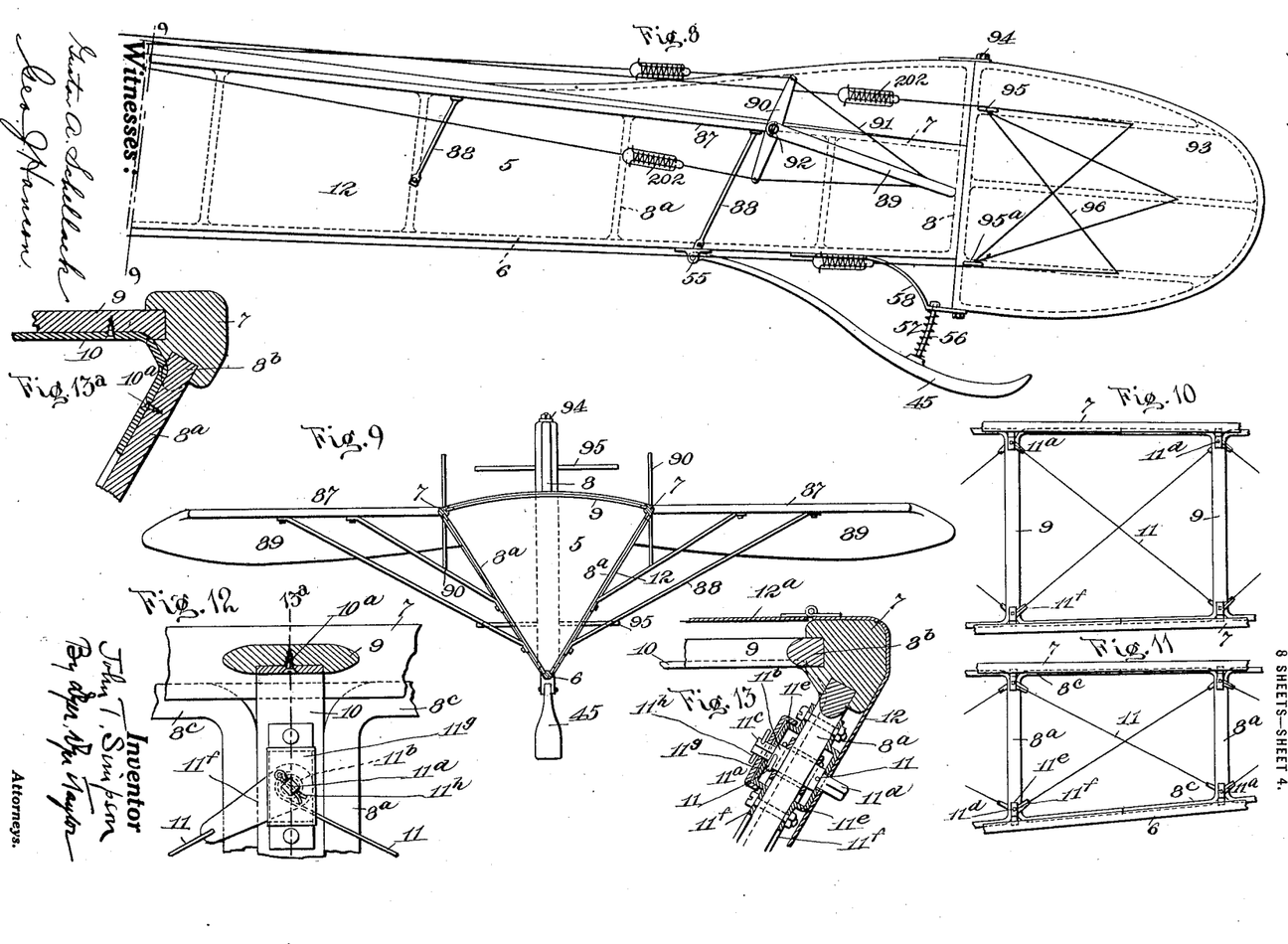

*The body.*—The body 5 is made up of longitudinal members, inclined and horizontal members, tie members, tension members and a covering, and is best shown in Figs. 8 to 13$^a$ inclusive. The structure which I herein disclose is an improvement on that illustrated in my applications for patent filed April 5, 1910, Serial No. 553,621, and filed July 12, 1910, Serial No. 571,557. The lowermost longitudinal member 6, which is analogous to the keel of a boat, extends from the front of the body to the rear. The other longitudinal members 7, 7, two in number, which are analogous to the clamps of a boat, are arranged above and each to one side of the center of the member 6, curving in at their ends, so as to meet the end vertical members 8, 8. The cross-section of the body is triangular in the middle, as best shown in Fig. 9, but gradually merges into a vertical line at each end, as shown in Fig. 1. The inclined members 8$^a$ are arranged at suitable distances apart, and the two longitudinal members 7 and 7 are connected at intervals by curved horizontal members 9, 9 analogous to the deck-beams of a boat, these horizontal members being located adjacent to the inclined members. The inclined members 8$^a$ and horizontal members 9 are each divided into three parts at the place which is adjacent to the longitudinal members. The center part 8$^b$ is countersunk into the longitudinal member and terminates there, as shown in Fig. 13$^a$. The two side branches 8$^c$, 8$^c$ are bent apart at substantially 90°, each being partly countersunk into the longitudinal member and extending to a point along the longitudinal member until it comes in contact with the brach of the next inclined or horizontal member, as shown in Figs. 10 and 11. The inclined and horizontal members in juxtaposition are tied together and to the longitudinal members by tie members 10, which are countersunk in the inclined, horizontal and longitudinal members, as shown in Figs. 12 and 13$^a$, and are secured by means of fastenings, such as screws 10$^a$. The rectangular panels formed by the longitudinal, inclined and horizontal members are connected by diagonal tension members, or wires 11, 11 (see Figs. 10 and 11), these members being connected to the horizontal and inclined members close to their points of connection to the longitudinal members. A tension device 11ª puts tension upon these wires. The wires are made in duplicate, that is, one on the inside and one on the outside of each inclined and horizontal member. A covering 12 (see Fig. 13) surrounds the sides and top of the body, except the open space, which is occupied by the aviator, this open space being analogous to the well or cock-pit of a boat, and is indicated by the character 13 (see Fig. 1). The tension devices are best shown in Figs. 12 and 13. Each comprises a peg 11ᵇ, having each end reduced and squared at 11ᶜ and 11ᵈ. These reduced ends pass through bearing plates 11ᵉ one on each side of an inclined or horizontal member. These plates serve as bearings for the peg. Each peg is adapted to wind up two wires, and to carry plates for anchoring two other wires. These plates are indicated by the character 11ᶠ, which plates loosely engage with the pegs. The wires 11 pass through holes in the peg, said holes being two in number at right angles to each other slightly offset, and the wires are tightened by rotating the peg by means of a key applied to the square end 11ᵈ, which projects through the covering 12. The peg is kept from turning, except when it is desired to adjust the tension on the wires, by means of a keeper 11ᵍ, which has a square opening through which the square end 11ᶜ passes, said keeper having depending edges which embrace the plate 11ᵉ. This keeper is held in place by a cotter pin 11ʰ, which is removed when the keeper is disengaged from the plate 11ᵉ, when the peg is to be rotated, a hatch or opening 12ª in the cover being provided for the purpose of permitting this to be done. There is one of these tension devices on each end of each inclined and horizontal member, so that two inclined tension members or wires are provided from each corner to the corner diagonally opposite in each panel formed by contiguous inclined and horizontal members.

*Planes.*—The details of the main plane are best shown in Figs. 1 and 19 to 26 inclusive. A spar 14 extends across the apparatus and forms the main support for the plane. An additional spar 15, parallel to the spar 14, supports the rear part of the plane. Longitudinals 16, measured in relation to the axis of the machine, are applied at the proper intervals at right angles to the spars. These longitudinals are made flat, with a central gutter (see Fig. 22). A lacing 17 of wire or other filamentous material, passes through openings in the longitudinals, the parts above and below the upper and lower longitudinals respectively, lying within the gutter. Where the lacing comes in contact with the spars 14 and 15, it is coiled several times around the latter. The ends of the longitudinals, at the rear, are preferably bent around a lateral rod or wire 18, and at the front the two ends of the upper and lower members of the longitudinals are connected to a nose-piece 19.

Figure 23:
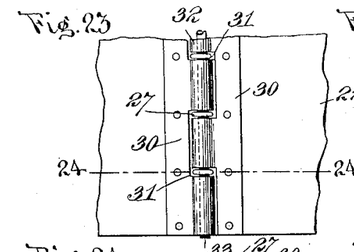
Fig. 23 is a detailed plan view showing the means for securing the ends of the covering together and to the ribs.
Figures 24, 26, 26A:
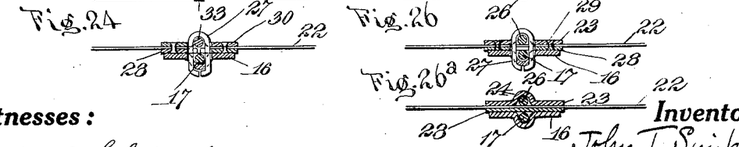
Figure 25:
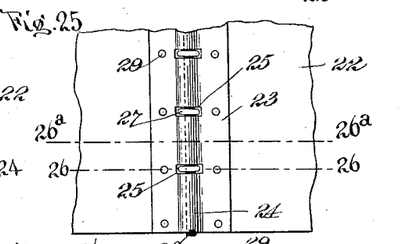
Fig. 25 is a view similar to Fig. 23 showing the means for securing the covering to the ribs.

At intervals, and parallel to the spars, are laterals 20, these laterals passing inside of the longitudinals, and in contact therewith. They are connected to the longitudinals in any suitable manner. The laterals are made like the longitudinals, with gutters, and they are provided with a lacing 21, similar to the lacing 17. Where the lacings 21 and 17 pass through the laterals and longitudinals, they may be secured by soldering or brazing; also the openings through which they pass may make a close fit so that the wires will be nipped and movement prevented. Where the wires cross, they may be wrapped and soldered so as to prevent relative movement. This produces a flexible and very light and strong foundation for the plane. The framing thus described is covered with flexible material 22. This covering is secured at suitable intervals to the longitudinals, and is arranged so that it can be taken off, and re-applied when desired. The details of attachment to the longitudinals are shown in Figs. 23 to 26ª. A plate 23, preferably of metal, and about as wide as the longitudinal, is secured to the upper surface of the covering adjacent to the longitudinal. This plate is channeled upward at 24, and this channel is provided at intervals with notches or slots 25. A wire or rod 26 rests wholly in this channel, and links 27 pass through the slots 25 and over the rod 26, the lower end of the links being bent around under the longitudinal member 16. By distorting the links 27, their lower ends may be straightened out and they can be removed. A plate 28 is secured by rivets 29 to the lower surface of the covering. This plate is provided with notches or slots similar to the slots 25 for passage of the links. The rod 26 engages with the upper surface of this plate and holds the same down, and through the connection of the rivets 29 they also hold the plate 23 down, keeping the covering in place. I prefer to make the covering in strips, each joint being parallel to and contiguous to a longitudinal. Figs. 23 and 24 show the means of attachment of contiguous strips. On the free edge of the cover is attached a plate 30, by means of rivets or other fastenings. This plate is provided with notches 31 at intervals, and is bent to tubular form at 32. The notches are substantially the same width as the tubular portions, and the plates on abutting portions of the cover are arranged so that the channels and notches will intermesh or dovetail like the leaves of a hinge. A rod or wire 33 passes through these channels, and connects sections of the cover together. The links 27 may be interposed at intervals in order to hold both plates down to the longitudinal below it.

Figure 6:
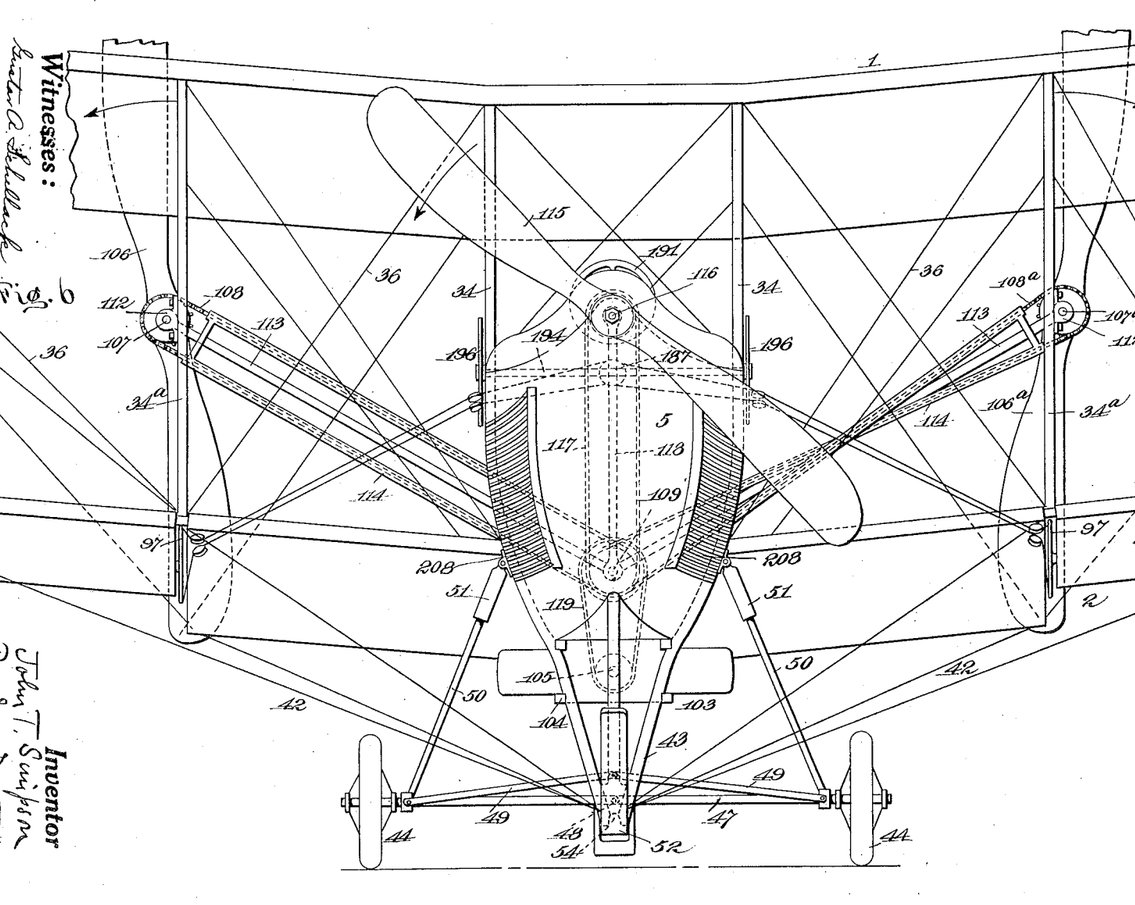
Fig. 6 is a front elevation, on an enlarged scale, of the central portion of the apparatus.
Figure 7:
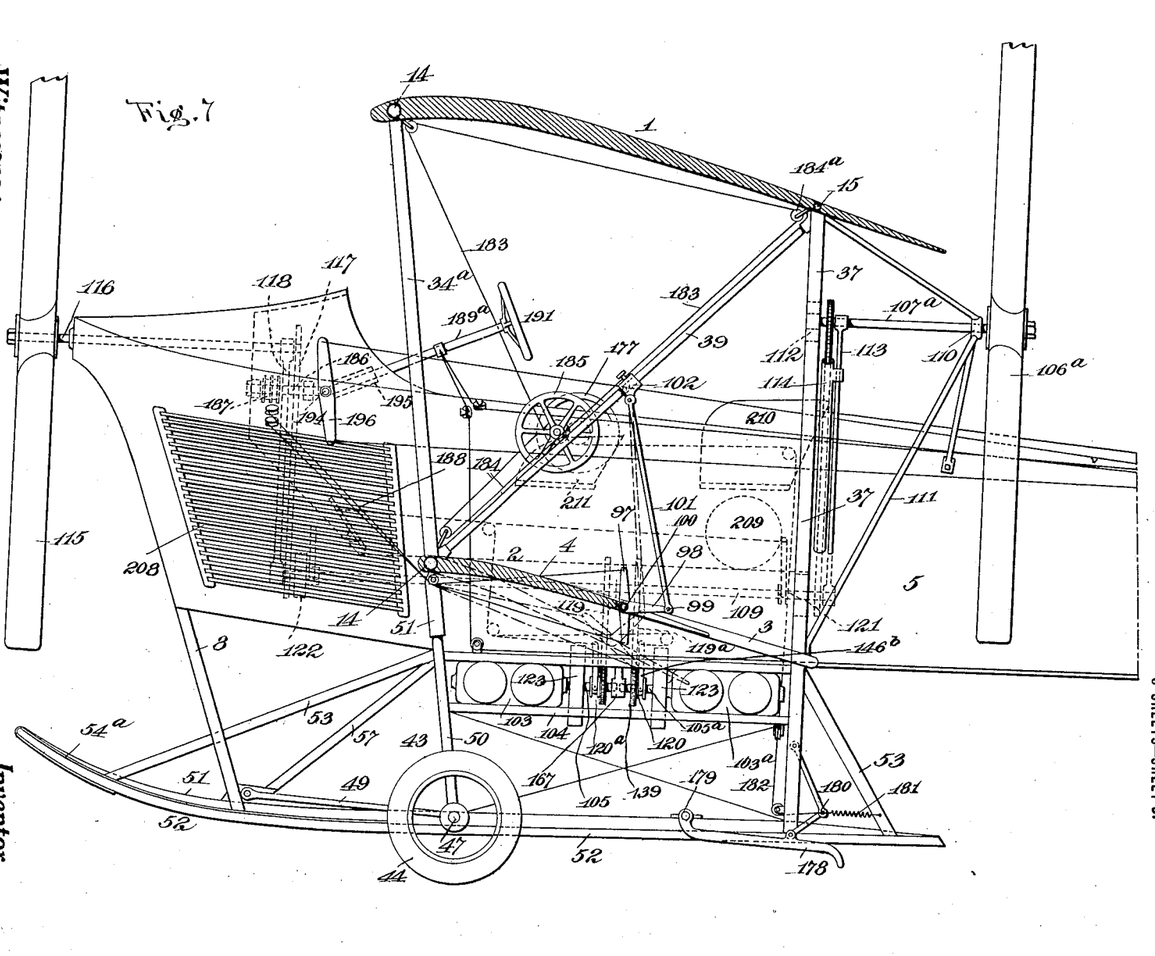
Fig. 7 is a side elevation of the forward part of the apparatus, the planes being shown in section.
Figures 27, 28A:
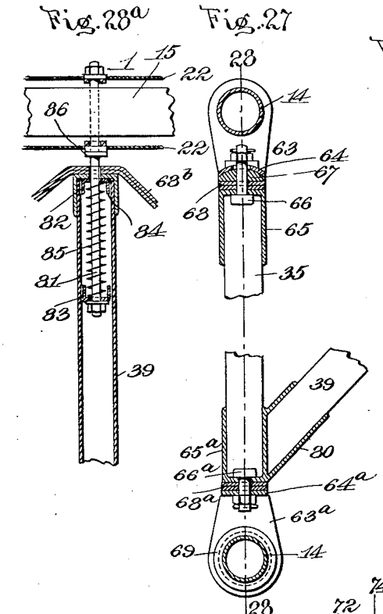

*Connections between body and planes.—* Fig. 7 shows the forward spar 14 of the auxiliary plane 2 passing through the front part of the body. The forward spar 14 of the main plane 1 is substantially parallel to the spar 14 of the auxiliary plane, and passes over the body. It is supported adjacent to its center by the two vertical members 34, see Fig. 6, which pass down the sides of the body and converge at a point some distance below the same. Two additional vertical members 34ª connect the ends of the fixed part 3 of the auxiliary plane with the spar 14 of the main plane. Fig. 27 shows other vertical members 35, disposed at intervals across the width of the machine, connecting the spar 14 of the auxiliary plane to the spar 14 of the main plane. Diagonal wires 36 brace the structure thus formed. The spar 15 of the main plane is supported by two vertical members 37. These vertical members 37 are connected to the sides of the body. Two more vertical members 38, in line with the vertical members 34ª, connect the spar 15 of the main sustaining plane and the spar 15 of the center part 3 of the auxiliary plane. This forms an open-work frame, which sustains the propeller shafts. Diagonal members 39 connect the spar 14 of the wing members 4, 4 of the lower plane and the spar 15 of the upper plane. Other diagonal members 40 connect the fronts of the lower planes with the spar 15 of the upper plane, and additional diagonal members 41 connect the spar 14 of the upper plane with the rear part of the center part 3 of the auxiliary sustaining plane 2. Members 42 connected at intervals to the front of the lower plane are connected to the depending portion 43 of the body, see Fig. 4.

Figure 28:
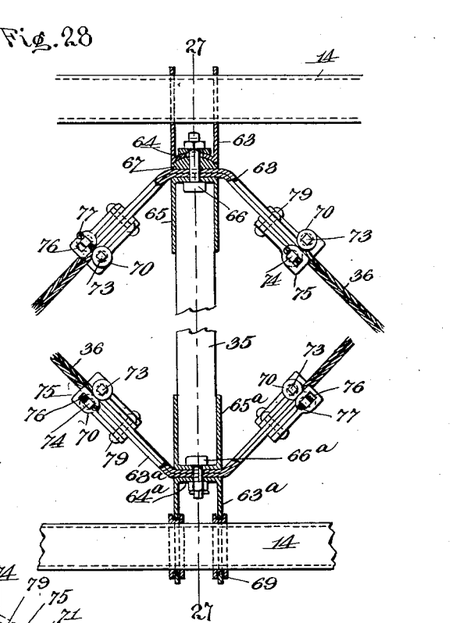
Fig. 28 is a sectional view taken on the line 28—28 of Fig. 27.
Figure 29:
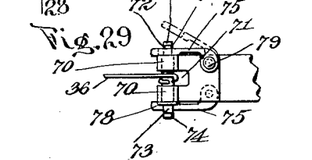
Fig. 29 is a detailed plan view of the wire tightener shown in Fig. 28.

The details of the connections between the spars of the lower plane are best shown in Figs. 27, 28 and 29 inclusive. The vertical member 35 is connected to the spar 14 of the upper plane by means of a fitting 63. This fitting, which may be formed of sheet metal, has two parts with a hole through each through which the spar passes; between these parts is a concave table 64. The upper end of the member 35 is provided with a ferrule 65. A bolt 66 passes through the upper end of the ferrule and the concave table 64; a washer 67 with its upper face convex in shape and engaging with the lower face of the concave table 64, is interposed, with the bolt 66 passing through it. Two strips 68 are interposed between the washer and the end of the ferrule. The bolt clamps all these parts together, and owing to the spherical nature of the washer and the table, the parts can adjust themselves to inequalities in tension. The lower end of the members 35 is connected very similarly to the upper end, but as shown, is not provided with the concave and convex features. A ferrule 65ª and fitting 63ª are provided, together with strips 68ª and a bolt 66ª. The table 64ª is flat instead of concave, and there is no washer. The fitting 63ª is secured to the spar 14 of the auxiliary plane by a mounting which permits rotary movement of this spar within the fitting. This mounting consists of collars 69, in which the fitting 63ª engages, the collars loosely turning within the fitting.

The diagonal wires 36 are connected to the strips 68 and 68ª by tension devices shown in Figs. 28 and 29. The details of these tension devices are as follows: The end of each strip is bent back over upon itself, forming a bearing 70. A notch 71 is provided about the middle of the bent back portion of the strip, and a peg 72 lies within this bearing 70. Both ends of the peg are squared, one end 73 being for attachment of a wrench or key, the other end 74 being for attachment of the keeper 75. This keeper has a squared notch 76 in its free end, and this notch fits over the squared end 74 of the peg. A cotter-pin 77 passes through an opening in the squared end 74, and holds the keeper in place. A collar 78 on the peg keeps it from moving in the opposite direction. The turned-over portions of the strip and the keeper 75 are secured together by rivets 79.

As shown, the strips are double, each having one of the tension members already described at each end; therefore, provision is made for the wires 36 to be in pairs, so that the strain upon each is substantially the same. Should one wire break, its mate is intended to be amply strong to take the strain. The diagonal members 39, are secured to the ferrule 65ª by a sleeve 80. The upper end of the diagonal member is secured to the rear spar 15 of the main plane by an elastic connection which allows a certain amount of relative movement. The details of this connection are as follows: A rod 81, is attached to the spar 15, and extends down into the center of the member 39, which is here shown as hollow, or if solid, into a hollow continuation of the same. This member 39 is provided with a sleeve 82, at its upper extremity, and strips 68ᵇ pass over and are secured to this sleeve. Inside of the member 39 the rod is provided with a cup 83, and a fixed cup 84 engages inside of the member and around the rod and against the sleeve 82. A coil spring 85 surrounds the rod and engages the two cups, holding them normally separated. A sleeve 86 on the rod normally engages with the strips 68ᵇ. When any sudden stress is put upon the rear ends of the main planes, they have a tendency to lift, which momentarily compresses the spring 85 without distorting the frame.

*Supporting apparatus.*—The apparatus is sustained upon the two wheels 44, adjacent to the front of the machine, and the skid 45 at the rear. In addition to these, there are wing skids 46, 46, adjacent to the outermost extremity of the lower planes. The two wheels 44, (see Figs. 4 and 6) are secured to the depending portion 43 of the body by means of an axle 47. This axle is pivoted at 48. Guides or braces 49 extend forward (see Figs. 6 and 7) and are pivoted to the depending portion. Inclined rods 50 connect the outermost portions of the axle adjacent to the wheel to the body. Shock absorbers 51 are interposed between the ends of the rods and the body. These shock absorbers contain stiff springs sufficiently strong to lift the main skid 52 from the ground under normal conditions, but when the car drops upon the ground, these absorbers will permit the axle to flex downward in the middle, allowing the skid to strike the earth and revolve the wheels from the shock of alighting. The main skid is supported upon the depending portion 43 of the body, and is strengthened by braces 53. This skid is formed with a flat bottom and a longitudinal strengthening bead 54, and in a kerf between the skid proper and rib it is provided with a strip 54ᵃ of spring metal, so as to give it elasticity and strength. The strip 54ᵃ laps over the end of the skid and is secured to its under side so as to form a shoe. The rear skid, best shown in Fig. 8, is pivoted at 55 to the bottom of the body, and is supported adjacent to its rear end by a rod 56 and a coiled spring 57. This rod is connected at one end to the skid 45 and at the other end to a fitting 58, the said fitting being secured to the bottom of the body and also forming the lower support for the vertical rudder. There is sufficient room above the fitting to allow the rod 56 to be raised when the skid strikes the ground. The wing skid 46, shown in Figs. 4, 5 and 5ᵃ, is pivoted at 59 to the front of the wing part of the auxiliary plane. The front of this skid turns up on a curve and is forked at 60. The two tines of the fork straddle the front member 35 and the diagonal member 39. A bar 61 is in front of the diagonal member, and a spring 62 connects this bar to the vertical member 36, and normally tends to hold the bar in contact with the inclined member. When the skid strikes the ground it turns upon its pivot 59 against the tension of the spring 62, allowing that end to slide along the ground. As soon as the wing skid lifts off the ground, as it will as soon as the apparatus becomes level, the spring 62 will swing the skid to its normal position so that it will be ready in case it strikes the ground again.

*Rear plane and rudder.*—The rear horizontal plane and rudder are best shown in Figs. 1, 8, 9 and 14. The tail plane 87, is arranged in two parts,—one part on each side of the body. They extend in a horizontal direction along the upper edges of the body from a point intermediate the center and rear end of the body, to a point adjacent to that part of the body which curves into the rear vertical member 8. The planes are of greatest width at the rear, tapering to a feather edge at the front, and may be made in any manner, preferably similar to the main plane as described. They are attached to the body, and are strengthened by braces 88. The horizontal rudders 89 are two in number, pivoted in line with the rear edges of the tail planes. These rudders are controlled by means of yokes 90, and wire braces 91. They are connected to a pivot 92, which extends through the body, each rudder 89 being rigidly connected to the pivot, so that the pivot turns with the rudder.

Figures 14, 15, 16, 17, 18:
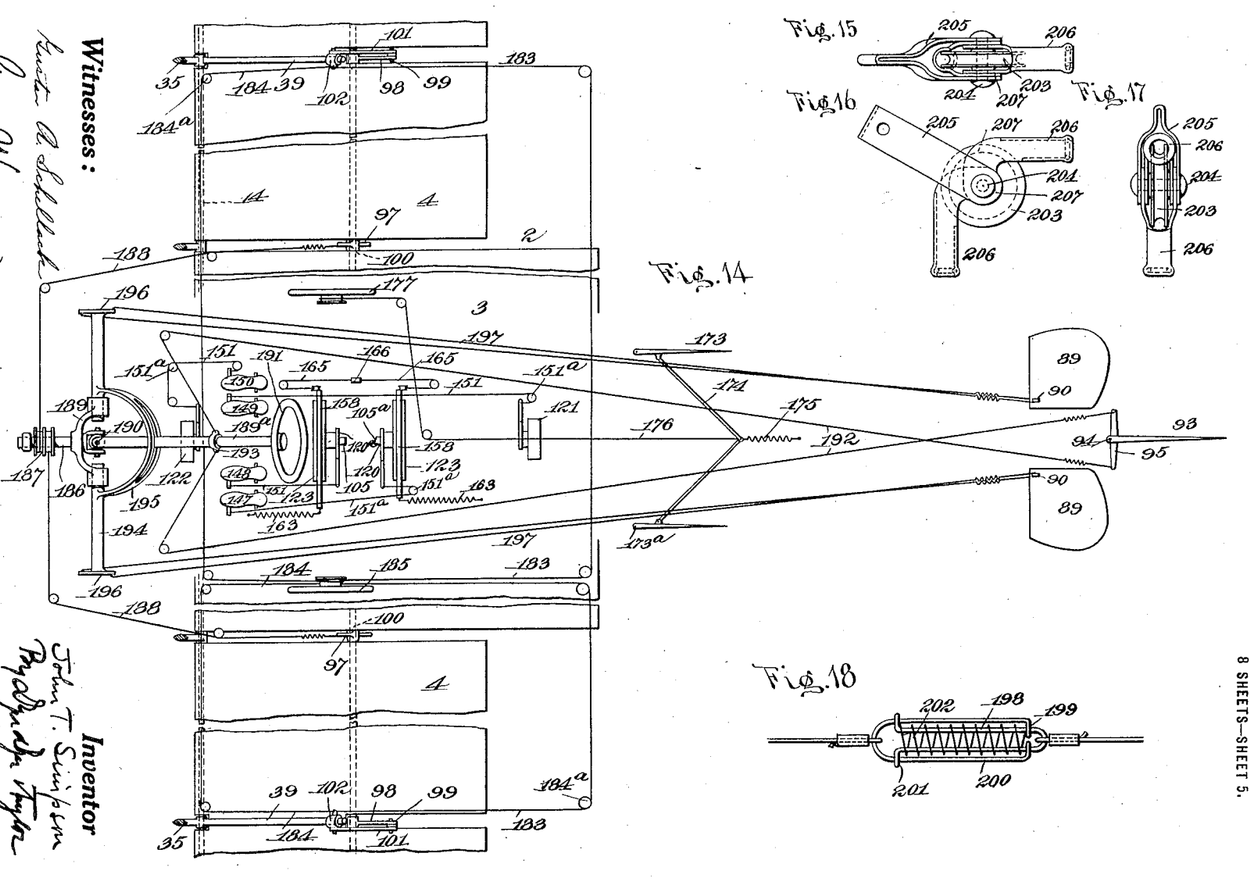
Fig. 14 is a diagrammatic view of the system of control for the apparatus.
Fig. 15 is a plan view of the preferred form of pulley used in connection with the controlling wires.
Fig. 16 is a side elevation of the same.
Fig. 17 is an end elevation of the same.
Fig. 18 is a detailed view of the preferred form of shock absorber or tension device for the controlling wires.
Figures 19, 20, 21:
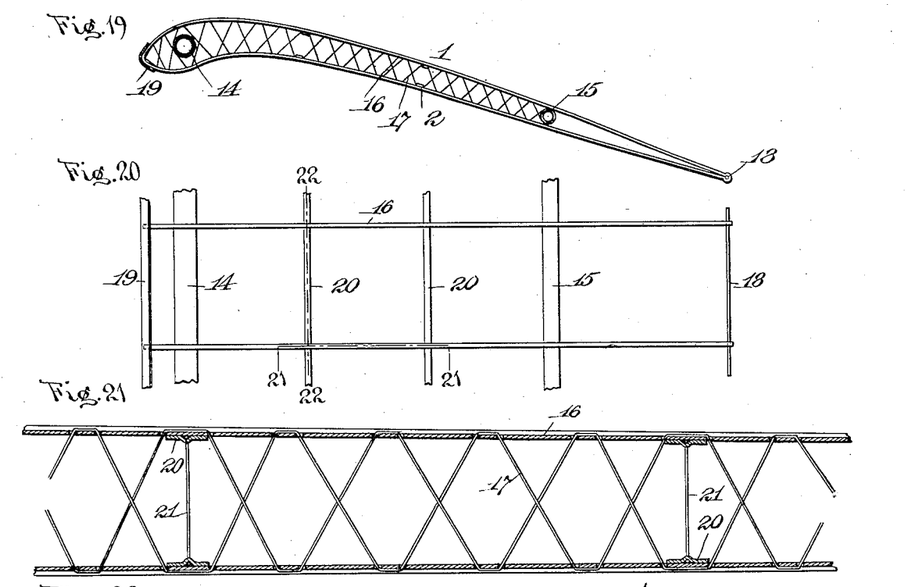
Fig. 19 is a side elevation of the preferred form of rib for the main planes.
Fig. 20 is a plan view of a portion of the main plane with the covering removed.
Fig. 21 is an enlarged sectional view taken on the line 21—21 of Fig. 20.
Figure 22:
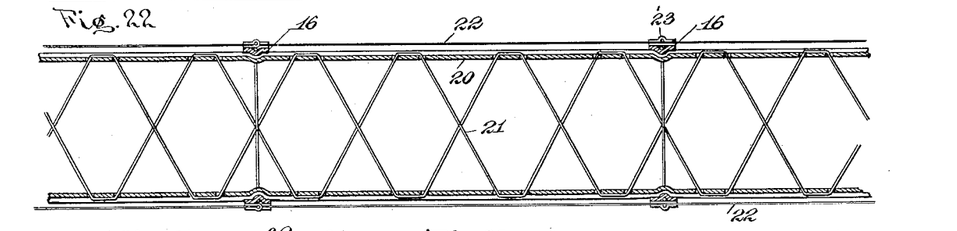
Fig. 22 is a similar view taken on the line 22—22 of Fig. 20 showing the covering in place.

The rear vertical rudder is shown in Figs. 1, 8 and 14. The rudder 93 is made of a frame covered with a fabric, and is secured in place by a top pintle 94, and a bolt on the fitting 58 at the bottom. The rudder is provided with two yokes 95 and 95ᵃ. Wire braces 96 connect the ends of these yokes to various points of the frame of the rudder.

*Adjustment of planes.*—The adjustment of planes is best shown in Figs. 3, 5, 6, 7 and 14. The main plane 1, and the center part 3, of the auxiliary plane 2 are rigid except the automatic, flexible adjustment of the rear ends of the main planes, as previously described; the winged parts 4, of the auxiliary plane are adjustable. These parts have a double adjustment. They are adjustable first to vary the angle of incidence in accordance with the speed of the machine or load carried or for braking. This adjustment affects both planes together; second,— they are adjustable for the purpose of stabilizing or maintaining a horizontal equilibrium. This adjustment is independent and affects both planes in opposite directions. That is to say,—moves in one direction on one plane, and in the other direction on the other, at the same time. The means for adjusting for stabilizing will first be described. The plane being supported at its front end by the spar 14, the latter being mounted in bearings that turn in the fitting 63ᵃ as described in connection with Fig. 28, the rear portion of the plane is adjusted up and down by the following mechanism: A yoke 97, is pivoted to the plane. The pivot 100 of the yoke carries arms 98, rigidly connected thereto. These arms 98 are fulcrumed at 99, which fulcrum is adjustably carried by the bracing of the main plane. As I will describe later, this fulcrum is movable in relation to the adjusting movement. Suitable wires, to be described later, twist the yoke. The fulcrum 99 being stationary, it follows that the pivot 100, of the yoke, when rotated, will be moved up and down and with it, the plane.

The adjusting device is as follows: The fulcrum 99 is carried by a rod 101. This rod 101 is carried by a sleeve 102. This sleeve 102 slides upon the diagonal member 39; a suitable device adjusts the position of the sleeve. Movement of this sleeve up and down on the diagonal member varies the position of the rod 101 and the fulcrum 99. It is apparent that the angle of the yoke 97 being secured against vertical movement by reason of the sleeve 102 being held unchanged, if the fulcrum 99 is moved up or down, the angle of the plane 4 will be similarly moved. The wires which control the yoke are so arranged that the movement of the fulcrum will not materially change the position of the yoke upon its axis.

Figure 36:
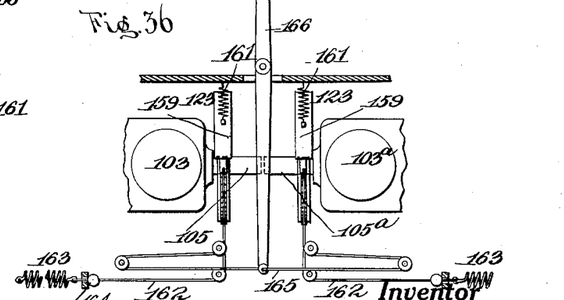
Fig. 36 is a side elevation of the same.

*Engine connections.*—The engine 103 is duplex, shown in the form of two members, 103 and 103ª, each having two double-opposed cylinders. The engine is supported upon a frame 104, lying below the body 5. Each engine has a shaft 105, 105ª, the two shafts lying end to end, as shown in Figs. 7 and 36. There are two propellers, 106 and 106ª, each mounted upon a shaft 107, 107ª, and connected by chain gearings 108, 108ª, to a countershaft 109. One of the chains is crossed, as shown, so that the two propellers turn in opposite directions. Each propeller shaft 107, 107ª, is carried upon an outer bearing 110, suitably supported by braces 111, and an inner bearing 112 suitably supported by the vertical member 37. Struts 113 connect the shafts 107 and 107ª to the countershaft 109. Castings 114, cover and protect the chains. A tractor 115, which is similar to the propellers except that its work is by pulling instead of pushing, is mounted upon the extreme front of the body and carried upon a shaft 116, and is supported in suitable bearings in the body. A chain 117 connects the shaft 116 to the front section of the counter-shaft 109. A strut 118 connects the two shafts at this point. Suitable devices are provided so that one or both engines may operate the propellers or the tractor, or both, or may be entirely disconnected. These devices are as follows: Each engine is connected to the countershaft 109 by a chain 119, 119ª. A friction clutch 120, 120ª, is interposed between the engine shaft and the chain. The connection between the countershaft 109 and the chains 108 and 108ª, is by means of a friction clutch 121, and the connection between the counter-shaft 109 and the chain 117, is by means of a friction clutch 122. These clutches 120, 120ª, 121 and 122, are capable of being independently connected and disconnected as will be described. By their manipulation it is possible to connect either or both engines to either the propellers or the tractor, or to both propellers and tractor, or to disconnect them at will.

Figure 32:
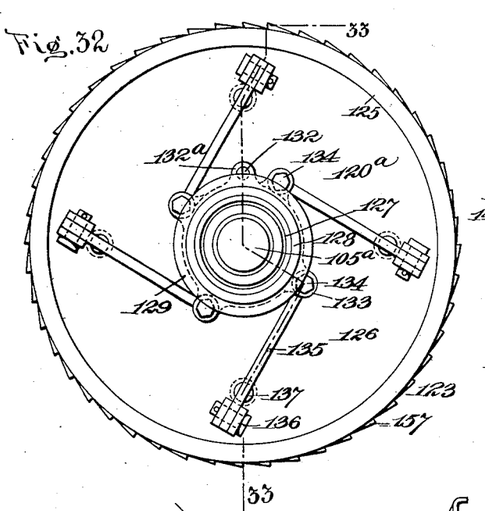
Fig. 32 is a side elevation of my improved clutch.
Figure 33:
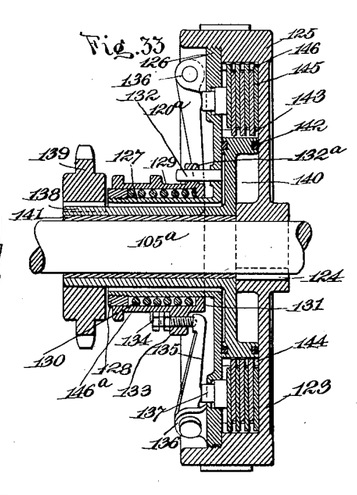
Fig. 33 is a section of the same, taken on the line 33—33 of Fig. 2.

*Clutch.*—I prefer to use the clutch illustrated in Figs. 32 and 33, in which the clutch is located within the fly-wheel of the engine. Referring to Figs. 32 and 33, 123 is the fly-wheel, secured to the shaft 105ª by means of a key or other suitable fastening 124. This fly wheel has a thickened rim 125, said rim overhanging the shaft, as shown. To the rim is attached a plate 126 by screw threads or other fastenings, as shown. This plate has a cylindrical sleeve 127, surrounding the shaft. On the sleeve is a removable flange 128. Surrounding this flange and sleeve is a barrel 129. This in turn surrounds the spring 130. One end of the spring abuts against the removable flange 128, and the other end against an inturning flange 131, carried by the barrel. This barrel has a longitudinal movement upon the sleeve 127, but is kept from relative rotary movement by means of a pin 132, which passes through an opening in a lug 132ª, and is carried by the plate 126. On the barrel is a plurality of bosses 133, which carry adjustable abutments 134. These abutments engage with levers 135, which are pivoted to ears 136 carried by the plate 126. Between the front end of the lever and its pivot is a pin 137, passing through an opening in the plate, provided with a head which engages the disks of the clutch.

Between the fly wheel and the plate, and between the sleeve 127 and the shaft, is a clutch member comprising a sleeve 138, and a clutch member proper 140. This sleeve 138 carries a sprocket 139, and turns upon the shaft 105 being provided with a bushing 141. The clutch member proper 140 carries annular gaskets 142, which bear against the inner face of the fly wheel and the inner face of the plate and serve to exclude dust and to prevent the escape of the lubricant which is outside of the clutch member proper. Annular plates 143 lie within the space outside of the clutch member and are secured to the same by having notches which engage with ribs 144 on the clutch member. Another set of annular plates 145, alternately arranged with the former set of plates, have notches which engage with ribs 146 carried by the fly wheel. The barrel 129 is provided with a groove 146ª, within which a fork 146ᵇ (see Fig. 7) plays and by means of which it is given longitudinal movement. The expansion of the spring through the agency of the levers compresses the plates and locks the parts together. By moving the barrel in the other direction, the plates are released and the fly wheel will turn without turning the sprocket 139.

Figure 34:
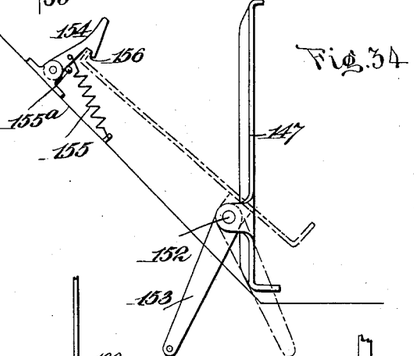
Fig. 34 is an elevation of a form of pedal for operating the clutches.
Figure 35:
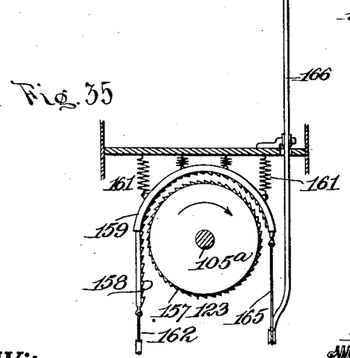
Fig. 35 is an end elevation, showing the devices for cranking the engines.

*Clutch actuating mechanism.*—The various clutches are actuated by four pedals (see Fig. 14); the pedal 147, controls the clutch 120; the pedal 148, controls the clutch 120$^a$; the pedal 149, controls the clutch 121, and the pedal 150, controls the clutch 122. These pedals are connected to their respective clutches by wires 151, passing around pulleys 151$^a$, as shown in Fig. 14. The details of each pedal are shown in Fig. 34 showing the pedal 147, but the same arrangement is used on the other three pedals. This pedal is supported upon a pivot 152, and carries a lever 153 to which is connected the wire 151. On the body of the car is pivoted a dog 154, moved into active position by means of a spring 155 against a stop 155$^a$. This dog is provided with a lip 156, which engages the free end of the pedal when the latter is pressed to the engaged position. The operator can press the pedal so that its free end engages with the dog, and then can remove his foot from the pedal. When it is desired to open the clutch the operator may kick the dog 154 from engagement with the end of the pedal and the clutch spring will cause the clutch members to engage. He can use his two feet for actuating the four pedals and controlling the four clutches.

Figure 37:
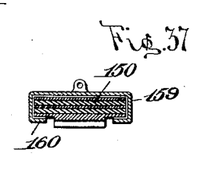
Fig. 37 is a detailed section of the cranking rack and its guide.

*Engine starter.*—The engine starting device is shown in Figs. 14, 35, 36 and 37. In a flying machine it is highly desirable to make the operator independent of engine stoppages, and this device, whereby the engines can be stopped and started without alighting, I regard as very valuable and important. The details are as follows:—The rim 125 of each fly wheel is provided with teeth 157, each of said teeth having an inclined and vertical face, constituting ratchet teeth. In connection with these teeth is provided a flexible band 158, this band being best formed, as shown in Fig. 37, of a series of metal and elastic bands of leather or rubber. This toothed band is carried in a frame 159, the shape of an arc of a circle. The frame has inturned edges 160, which support the band at its edges, allowing the teeth to be exposed. The frame is supported in the body of the aeroplane by means of springs 161, shown in Fig. 35. The band is moved normally in one direction by a wire 162, through the agency of a spring 163; a stop 164 limits the extent of movement. The band is moved in the other direction by means of a wire 165, through the agency of a lever 166. When at rest normally, the springs 161 hold the band out of contact with the teeth on the fly wheel. Upon the lever being moved to exert stress upon the wire 165, the effect will be to first depress the frame 159 against the tension of the supporting springs 161, bringing the teeth of the band into contact with the teeth of the fly wheel. Further movement will expand the spring 163, moving the band through its frame and exerting rotary stress upon the fly wheel. When the engine starts, the teeth will become disengaged, owing to their ratchet shape. It will be seen from this device that by moving the lever 166 forward one engine will be cranked, and backward the other engine will be cranked, thus operating two engines with one lever.

Figure 30:
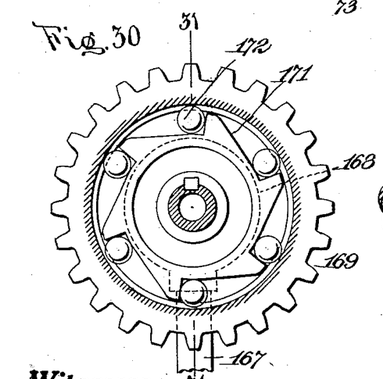
Fig. 30 is a detailed sectional view of the engine shaft and one of its sprocket wheels, the sectional view being taken on the line 30—30 of Fig. 31.
Figure 31:
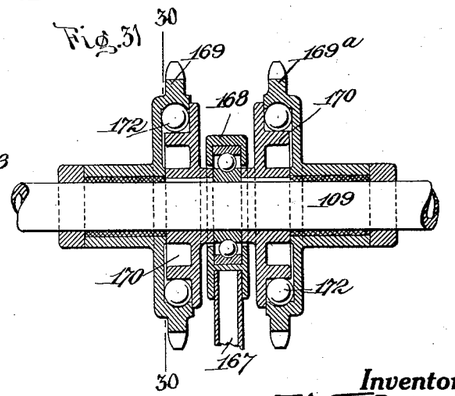
Fig. 31 is a section taken on the line 31—31 of Fig. 30.

*Overriding device.*—The over-riding device is best shown in Figs. 30 and 31. The shaft 109 is connected to the engine shaft by means of a radius rod 167 and a bearing 168. Sprockets 169, 169$^a$, are provided for the chains 119, 119$^a$. These sprockets are connected to the shaft 109 by means of clutches 170; each clutch has a series of cams 171, and balls 172. When the sprocket rotates in one direction, the balls fall to the base of the cams and when rotated in the other direction, the balls ride up on the faces of the cams and jam between them and the inner face of the recess in which the cams and balls play, locking the shaft and the sprocket together. This is the preferred form of clutch, but it is to be understood that any other similar form of clutch can be used. By utilizing a clutch for each sprocket, it is apparent that the load will be taken up by the faster moving engine. If one engine moves slower than the other, its clutch will be disengaged and will not do any of the work. I find this arrangement very useful, as it enables me to stop one engine without altering the speed of the other, and then, when necessary, the engine which is stopped can be started, and it will run until it gets the same speed as the other engine, when it will take its share of the load.

*Brakes.*—The brakes are shown in Figs. 1, 7 and 14. These brakes are in addition to the auxiliary planes. I provide two wind-brakes, 173, (see Fig. 14) pivoted to the frame of the machine and actuated by toggle levers 174. A spring 175 normally moves these levers in position to keep the brakes in a longitudinal line with the direction of travel of the machine. A wire 176, working in the direction opposite the tension of the spring, serves to swing the brakes upon their pivots 173$^a$ at right angles to the direction of travel, as shown in Fig. 1, making a wind brake for checking the speed of the machine. By using a toggle joint the brakes may be kept open with very little effort. The wire 176 is controlled by means of a wheel 177 adjacent to the aviator. In connection with the wind-brakes I employ a ground brake or brake shoe 178, shown in Fig. 7. This brake shoe is secured by a pivot 179 to the machine, and is actuated by means of a toggle 180. A spring 181 normally flexes the toggle and lifts the shoe from the ground. The toggle is moved in the other direction by means of a wire 182, passing around pulleys as shown, and around the drum on the wheel 177.

*Controllers.*—The angle of incidence of the planes 2, 2, is controlled by means of wires 183, 184, (see Fig. 7) which move the sleeve 102 upon the rod 39. These wires pass around suitable guide pulleys 184ª, to a drum carried by the wheel 185, said wheel being located at one side of the aviator and opposite the wheel 177. The devices for steering and stabilizing are best shown in Figs. 7 and 14. A shaft, 186, carrying drums 187, is mounted in suitable bearings 189; wires 188, connect the drums 187 to the yokes 97 (see Fig. 7.) A shaft 189ª is connected to the shaft 186 by a universal joint 190. The free end of this shaft carries a hand wheel 191 within convenient reach of the operator. The shaft 189 is connected by wires 192 to the rudder 93, the ends of the wires being connected to the shaft by means of a sleeve 193, allowing the shaft to turn. These wires are crossed, as shown in Fig. 14, so that the rudder will turn in the same direction as the shaft 189, and the machine will, therefore, turn in the direction in which the hand wheel is moved. For the purpose of operating the stabilizing devices, a cross shaft 194 is provided, its ends being mounted on the bearing 189. This shaft is made in two parts, interrupted by the universal joint 190 and these two parts are connected by a slotted sector 195. The shaft 189ª passes through the slot in the sector. This slot allows the shaft to be moved from side to side, effecting horizontal steering, and, through the engagement of the shaft with the walls of the slot, oscillating the shaft 194. On the outer ends of the cross shaft 194 are arms 196, (see Fig. 7), and these arms make connections by wires 197 to the rudders 89. It will be apparent from an examination of Fig. 14, that the wires of both rudders are in duplicate (see Figs. 7, 8 and 14), hence, if one wire breaks, the rudders will not be out of control.

*Shock absorbers.*—The shock absorbers which are shown as supplied to the wires in Figs. 8 and 14, are shown in detail in Fig. 18, each comprising an inner frame 198, having looped ends 199 and an outer frame 200, and looped ends 201. The body of each frame plays in the loops of the other frame, as shown in Fig. 18. A spiral spring 202 surrounds the inner frame and abuts against the looped ends of the latter, and is secured by the looped end of the outer frame. This spring keeps the absorber in distended position, as shown in Fig. 18, thereby providing for sudden stress to temporarily compress the spring and do away with the shock and also allow the machine to automatically right itself.

*Guide pulleys.*—Guide pulleys are utilized in every place in the machine where the wires make a turn. The guide pulley as is best shown in Figs. 15 to 17 inclusive, comprises a wheel 203, mounted upon a shaft 204. The shaft is connected to and supported by a bail 205. Guides 206 are provided, said guides having ears 207, which are pivoted to the shaft. These guides have central openings sufficiently large for the wires to easily play within them, but they turn upon their pivots around the shaft in accordance with the change in leverage of the wires, and prevent the latter from jumping out of the groove in the wheel.

*Details.*—In addition to the details already described, Figs. 2 and 7 show the radiator 208 arranged upon the front of the body immediately behind the tractor where the air forced rearward by the latter will engage with it. 209 is an oil tank arranged below the passenger seat 210. The aviator's seat 211 is arranged within convenient access of the controlling devices already described. Two gasolene tanks, 212, 212, are arranged in the front of the body on each side of the tractor shaft.

It will be understood that while I have described the devices for controlling the angle of the auxiliary plane for stabilizing as moved by the lever or yoke 97, connected to the fulcrum 99 which is ordinarily fixed for and varying the angle of incidence by moving the latter fulcrum by means of the sleeve 102, it is apparent that the reverse may be done for stabilizing and for changing the angle of incidence. In other words, the sleeve 102 may be moved for the purpose of stabilizing and braking, while the yoke 97 may be moved only for changing the angle of incidence.

It is to be understood that the engine may be of any type, but I prefer to make it as shown, of the internal combustion type, using a liquid hydrocarbon as fuel.

In accordance with the provisions of the patent statutes I have described the principle of my invention together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:

1. An aeroplane having a body, a main sustaining plane and an auxiliary sustaining plane, a front spar for each of the planes, a rear spar for the main plane, said rear spar being supported from the front spar of the auxiliary plane and a spring cushion between the rear spar and auxiliary plane.

2. An aeroplane having a main plane, an auxiliary plane below the same, and vertical members connecting the fronts of the main and auxiliary plane, diagonal members connecting the front of the auxiliary plane to the back of the main plane and supporting the latter, and flexible connections between the diagonal members and the main plane.

3. An aeroplane having a body, a main sustaining plane above the body, an auxiliary plane below the body, said auxiliary plane being formed of a center section and adjustable wing tip, vertical members connecting the front of the main plane with the front of the auxiliary plane, additional vertical members connecting the rear of the main plane with the rear of the center fixed portion of the auxiliary plane, and diagonal members connecting the rear of the tips of the main plane with the front of the tips of the auxiliary plane, whereby the wing tips of the auxiliary plane are supported at their forward edges only.

4. An aeroplane having main planes, members connecting the planes, and wires under tension connecting the planes, the said wires being secured to pegs said pegs having non-circular portions, and devices preventing the pegs from rotating, said devices being in the form of pivoted keepers having sockets for engagement with the non-circular portions.

5. An aeroplane comprising main planes, members connecting the planes, two strips connected to each end of a member, a tension device on each end of each strip, and a wire connected to each tension device whereby the wires are in pairs, and the tension devices lie side by side.

6. An aeroplane having a framework consisting of a plurality of horizontal members constituting front and rear spars, a main sustaining plane extending from the rear spar to the front spar, members for supporting the spars, a rigid connection between the front spar and a supporting member, and a sliding connection between the rear spar and a supporting member, said latter member having a recess, and said connection including a spring within the recess.

7. An aeroplane having a frame and a plane, a yoke pivoted to the plane, means carried on the frame for raising and lowering the yoke, means for adjusting the position of the raising and lowering means thereby adjusting the position of the plane and means for rocking the yoke on its pivot for adjusting the position of the plane.

8. An aeroplane having a plane, a yoke pivotally connected to the plane, a fulcrum for the yoke, means for varying the position of the fulcrum and independent means for rocking the yoke on its pivot.

9. An aeroplane having planes, a diagonal member connecting the planes, the pivoted lower plane being supported adjacent to its forward edge, a sleeve moving on the diagonal member, a rod connected to the sleeve, a yoke pivoted to the plane and having a member connected to the rod, means for sliding the sleeve, and independent means for moving the yoke.

This specification signed and witnessed this 17th day of August, 1911.

JOHN THOMAS SIMPSON.

Witnesses:
LEONARD H. DYER,
GUSTAV A. SCHELLACK.